E. KLEIN.
EDIBLE FATTY PRODUCT FROM FIXED OILS AND FATS AND PROCESS OF MANUFACTURING SAME.
APPLICATION FILED NOV. 5, 1918.

1,381,564.

Patented June 14, 1921.
3 SHEETS—SHEET 3.

INVENTOR:

UNITED STATES PATENT OFFICE.

EMANUEL KLEIN, OF NEW YORK, N. Y.

EDIBLE FATTY PRODUCT FROM FIXED OILS AND FATS AND PROCESS OF MANUFACTURING SAME.

1,381,564.     Specification of Letters Patent.     Patented June 14, 1921.

Application filed November 5, 1918. Serial No. 261,220.

*To all whom it may concern:*

Be it known that I, EMANUEL KLEIN, a citizen of the United States, and a resident of the borough of Manhattan, city, county, and State of New York, have invented a new and useful Edible Fatty Product from Fixed Oils and Fats and Processes of Manufacturing Same, of which the following is a specification.

My invention relates to new products procured from all those naturally formed substances in all trades in cotton seed, seed products and fat which consist mostly of the glycerids of unsaturated acids in an association of saturated fatty acid with which unsaturated free fatty acids,—oxy fatty acid, lactones, aldehydes, anhydrids of fatty acids, ketones, butyl, amyl, caproyl, capryl, aldol, esters of oxyacid,—saturated and unsaturated aldehydes, oxynitrile, paraldehyde, acetal, oxim, allyl and croton aldehyde, and terpenes are admixed, and more particularly the new oil products, produced from vegetable oil bearing material *Gossypium hirsutum* or *herbaceum* (upland cotton) and *Zea mays* L. (maize or corn oil) suitable for edible purposes.

Many of our well known fixed oils and fats are composed mainly of these distinct fats, tristearin $C_3H_5(O.C_{16}H_{35}O)_3$, tripalmitin $C_3H_5(O.C_{16}H_{31}O)_3$, triolein $C_3H_5(O.C_{18}H_{33}O)_3$, mixed in varying proportion. As olein is liquid at ordinary temperatures, while the other two fats are solid, it follows that the consistency or hardness of fixed oils and fats depends upon the relative proportion of the three individual fats. Any part of the fixed fat and oil which consists chiefly of cells distended with greasy or oily matter, which leaves a permanent greasy stain, and any of a class of compounds of which the different varieties of natural fat, are mixtures. They are glyceryl esters or etherial salts, and are formed by replacing the hydrogen of an acid, and on saponification yield glycerin. They are combustible, cannot be distilled unchanged and are soluble in ether, but not in water. Fatty oils are fluid at ordinary temperature. During the life of an animal, etc., the fat is mainly in a liquid state in the fat cells owing to the solubility of the two solid fats in the more liquid olein at the body temperature. Oils and fats are formed from carbohydrates and are neutral substances composed of carbon hydrogen and oxygen. Liquid or fluid oils, as cottonseed, soya, Mazola corn, sesami, olive, linseed, etc., at ordinary temperature are essentially triolein, an etherial salt in which the oleic acid radical is united with the glycerin radical which acts as base. In mutton tallow, which is hard, tristearin predominates, whereas in beef tallow there is more tripalmitin and triolein. In lard, triolein is still more abundant, which is indicated by the soft, pasty consistency of the material, having a neutralization number of 173 to 219 when analyzed and tested.

In the manufacture of products intended for edible purposes, the highest grade of purity is demanded, therefore the chief attention must be devoted to the removal of free fatty acids, aldehydes, lactones, ketones, acids of higher fatty alcohols, esters of oxy fatty acids, resins, terpenes, volatile and non-volatile flavor, chlorophyl, albumin, and acetals, which if present in the oils and fats, of course remain dissolved in the neutral glycerids. For the removal of free fatty acids alkalis and alkaline earth are almost exclusively used. Conjointly with the free fatty acids there are also removed natural impurities, such as mucilaginous and albuminoid substances, which are instrumental in bringing about hydrolysis, and thus give rise to the formation of free fatty acids and to rancidity, which follows in the wake of hydrolysis.

On cold pressing, a colored linseed oil is obtained having a pleasant taste, so that it can be used as an edible oil. The oil is also used as linseed oil fat in admixture with tallow or lard. By far the largest quantities of linseed oil are however, employed in the arts.

Considered chemically a number of edible fats (solid fats) are produced on a manufacturing scale as substitutes for the natural products. These edible fats are artificially mixtures of different oils and fats. A fat corresponding to this description is cotton seed stearin, contained in the fixed liquid upland cotton seed; or the cocoa stearin fit for consumption.

In the case of compound substitutes it is important to avoid the product becoming unctuous and semi-transparent, which would indicate that the mixture will separate in course of time by a kind of liquation process into oil and saturated fatty acid. Edible table fat substitutes not being cooked do not keep well and cannot, therefore, be used like steamed products for domestic purposes. This fact as being due to the enzyms, considered as the primary cause of the incipient stages of rancidity not having been destroyed completely at the comparatively low temperature at which these brands are rendered. According to the fixed liquid oils, its proportion in the final product varies. If fixed liquid oil be large, saturated fatty acid of a high titer test, or even hydrogenated substitutes must be employed. Other products (lard substitutes) contain no lard whatever, being judiciously prepared mixtures of solid fatty acid and fixed liquid oil. The manufacture consists simply in mixing the various saturated and unsaturated acids in the melted state in a mixing tank, and cooling the mixtures rapidly according to the seasons. In summer the quantity of the solid fatty acids is increased whereas in winter the proportion of the more fluid constituents becomes higher. Thus it is feasible to place on the market a product of the same consistency all the year round.

For the preparation of edible fatty oils, the mass is packed in bags and expressed in hydraulic presses in the cold, under a pressure of 300 atmospheres or more (equaling a pressure of two tons or more to the square inch), so that the oil may exude readily. Lard oil is produced from prime steam lard by allowing it to crystallize at a carefully regulated temperature so that the stearin may separate as a crystallized mass, ready to part with the lard oil when subjected to upright screw, automatic, mechanical or hydraulic presses, and from 40 to 60% of the lard is obtained as oil. If no proper crystallization takes place, it is impossible to express the oil, as the material passes through the cloths (demargarinating process). The oil is a water-white to pale yellow liquid at the ordinary temperature. Those lard oils which are unsuitable and unfit for edible purposes, and contain a small amount of free fatty acids, ketones, aldehydes, etc., are used as lubricating oils, wool oils, or converted into candle material, etc. Tallow oil is a liquid or semi-solid according to the temperature at which it has been expressed. It is a light yellow bland oil, and of an odor resembling tallow. It is used to mix with other oils.

By my newly discovered art of producing neutral edible fat product, the oil bearing material or fatty substances to be treated, may be deteriorated, moldy, old or damaged. The principal object of the present invention is to produce a new edible table oil, or fat product used in the arts, by destroying, eliminating and removing from the oil-fat-bearing material all the deteriorated aliphatic series of olefin, acetylene, halogenalkyl, alcohol, ether, ester, nitro, amin, aldehyde and ketone, lactone, volatile and non-volatile fatty matter, terpenes, resins, albumin and mucilaginous substances and at last all free fatty acid.

Another object of the invention is to produce a new edible fixed oil or fat product, of a color reading of not more than 21 yellow and 1 to 4 red to nearly water-white color, by destroying, eliminating and removing the phenol, gossypol, chlorophyl, or color matter.

Another object of my invention is to produce a new edible fatty product constituted of tristearin, tripalmitin, triolein, of a definite specific gravity 0.900 to 0.952 at 15° C. or 0.852 to 0.952 at 79° C., of a definite saponification value 170 to 198, of an iodin value 51 to 121, of a melting point 70 to 21° C., a solidifying point at 70 to 27 or −10.0 to 15° C. as analyzed and tested.

Another object of my invention is to produce a new fixed oil or fat product constituted of tristearin, tripalmitin, triolein of neutrality and free of rancidity which when in liquid form does not react with 4 or 5 drops of diluted 3% hemoglobin solution in the presence of a freshly prepared tincture of guaiac; or does not react with the phloroglucin indicator, etc., and does not redden blue litmus paper; it dissolves sparingly in absolute warm alcohol, and is readily soluble in warm ether, having a neutralization number 173 to 219 when analyzed and tested.

Another object of this invention is to produce an improved new oil fat product of a desired consistency and maximum volume by subjecting the crude oil or fat base to chemical and mechanical action of compressed heated air contacting with purifying substances and subjecting the fatty mass to the action of the purified prepared changed hot air into produced purified cold air, procreated by contact with aerification below zero to act in the presence of organic and inorganic agents, whereby the deteriorated harmful aliphatic substances precipitate, and the said product will be cheaper, palatable food stuff, and will cost less, less labor and less time, and may be employed for table, medicinal and technical purposes, and employed in the arts.

It will thus be seen that my improvements relate not only to a new product but also to the process by which such new product is attained.

In the accompanying drawings I illustrate means adapted to the requirements of my invention, although I do not restrict myself to the identical form of construction of parts and apparatus shown.

Figure 1:
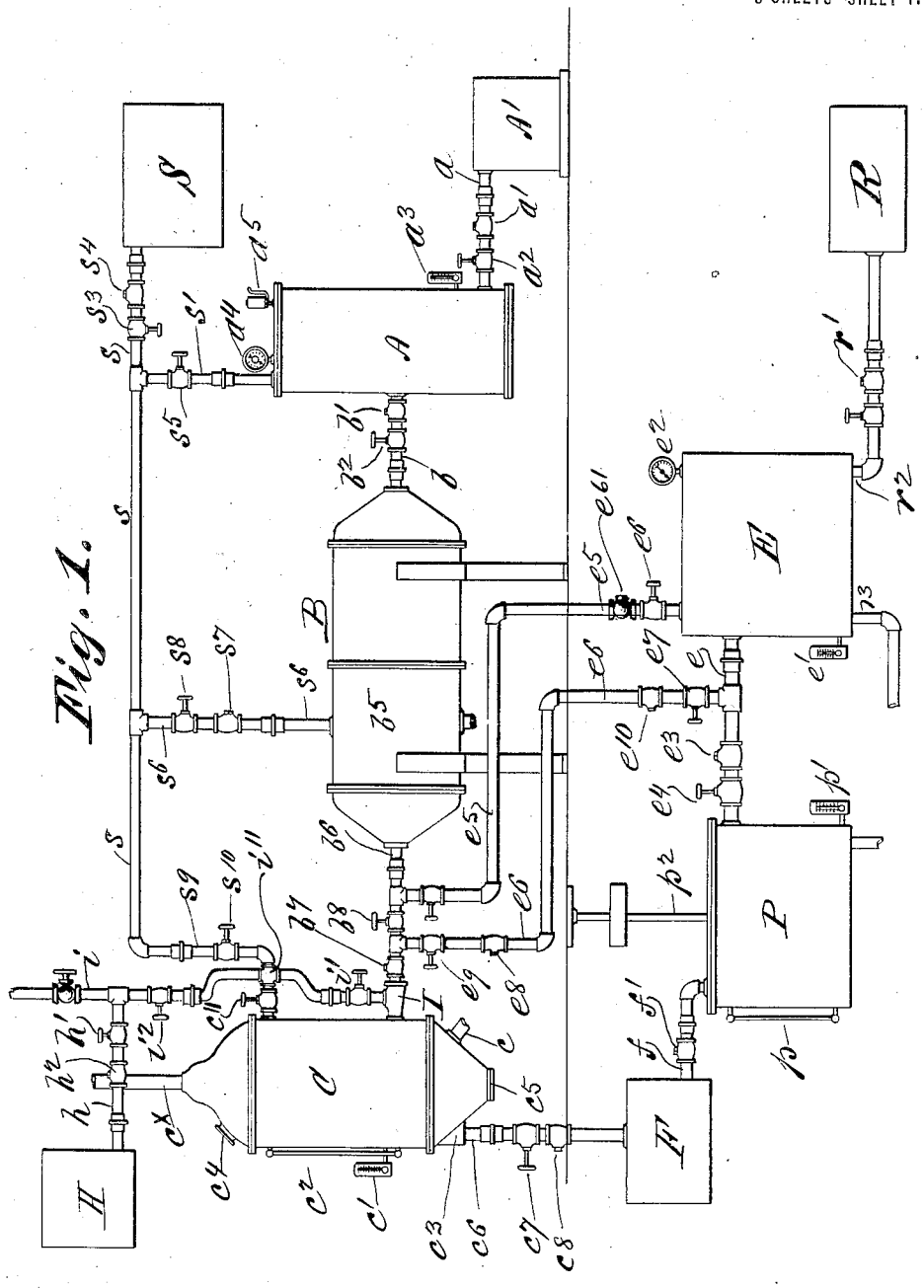
Figure 1, is a diagrammatic representation of a unitary plant embodying apparatus suitable for the practical working of my process.

In the diagram Fig. 1, S, represents a source of superheated steam, $s$, being the conductor or service pipe connected therewith. A branch $s'$, of this service pipe $s$, communicates with the steam coil $s^2$, (shown in Fig. 2) in the compressed air superheating chamber A. A hand valve $s^3$, and a check valve $s^4$, are interposed in the service pipe $s$, between the source of superheated steam S, and a branch pipe $s'$, which latter is also provided with a valve $s^5$. The superheating chamber A, is connected with an air compressor A', by a pipe $a$, in which is interposed a check valve $a'$, and hand valve $a^2$. The superheating chamber A, has also connected with it a temperature indicator $a^3$, a pressure gage $a^4$, and a relief valve $a^5$.

The purifier B, is connected with the compressed air superheater A, by means of a pipe $b$, in which is interposed the usual check valve $b'$, and hand valve $b^2$. The portion of the purifier cylinder B, adjacent to the air superheating chamber A, is provided with manholes $b^3$, $b^4$, for the introduction and removal of material; and another portion of said cylinder is formed with a steam jacket $b^5$, connected with a branch $s^6$, of the superheated steam service pipe $s$, before referred to,—said branch $s^6$, having interposed in it the customary check valve $s^7$, and the hand valve $s^8$. Access is had to the portion of the purifier cylinder B, encircled by the steam jacket $b^5$, by means of manholes $b^{10}$, $b^{11}$.

Figure 2:
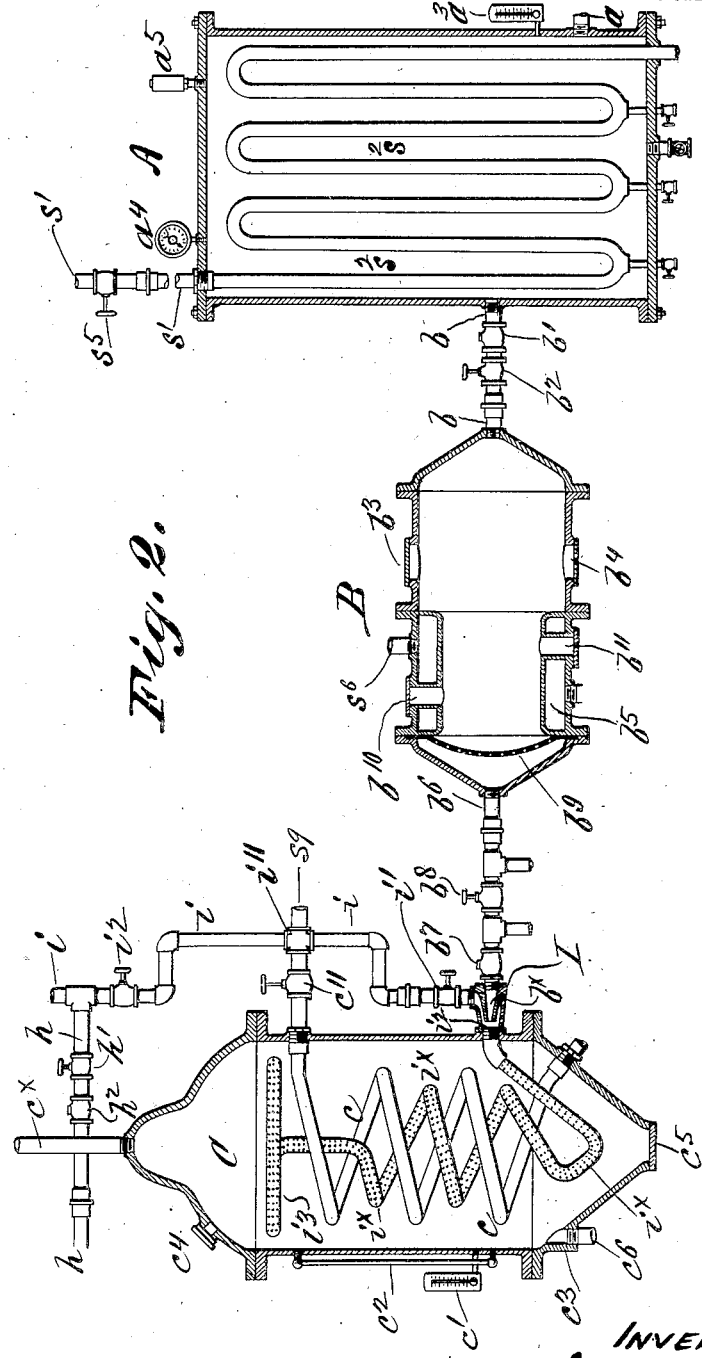
Fig. 2, is a sectional elevation of the superheater, purifier and refiner relatively positioned but with the connection broken off so as to show the interior construction of said units upon a larger scale.

The jacketed end of the purifier cylinder B, is connected with the refining chamber or vessel C, by means of a pipe $b^6$, provided with check valve $b^7$, and hand valve $b^8$. A reticulated screen $b^9$, is interposed in the cylinder B, between the jacketed portion thereof and the outlet through the pipe $b^6$. Interposed in the pipe $b^6$, and refining chamber C, is an injector I, the nozzle $b^x$, of which forms the termination of the pipe $b^6$, from the purifier cylinder B, as shown more particularly in Fig. 2. The shell of said injector is connected by a pipe $i$, with an independent source of steam supply under pressure, a regulating valve $i'$, being interposed in said steam supply pipe $i$. The interior of the shell or casing of the injector I, communicates with the inlet $i^2$, to perforated pipe $i^x$, which latter is positioned and coiled upward within the refining chamber C,—the nozzle $b^x$, of the pipe $b^6$, from the purifier cylinder B, being opposed to and in alinement with said inlet $i^2$, to the perforated pipe $i^x$. The refining chamber C, also contains a coil of imperforate piping $c$, the convolutions of which interlace between the convolutions of the perforated pipe $i^x$, as shown in Fig. 2. To the upper end of this heating coil $c$, is connected a branch $s^9$, of the superheated steam supply pipe $s$, said branch $s^9$, being provided with a control valve $s^{10}$. The lower or exhaust end of the coil $c$, extends through the lower portion of the refining chamber C, which latter is provided with temperature indicator $c'$, a liquid level gage $c^2$, a discharge outlet $c^3$, an upper manhole or inlet $c^4$, for introduction of material, and a lower discharge manhole or outlet $c^5$, for the removal of sediment etc. The upper part or dome of the refining chamber is also provided with vapor exhaust pipe or outlet $c^x$.

The discharge outlet $c^3$, communicates through a pipe $c^6$, with a filter F, below,—said pipe $c^6$, being provided with the hand valve $c^7$, and check valve $c^8$. The filter F, is in turn connected by a pipe $f$, with the finishing or product chamber P, a check valve $f'$, being interposed in said pipe $f$. The finishing or product chamber P, is provided with a liquid gage $p$, and with a temperature indicator $p'$, and contains a rotary agitator $p^2$, of suitable construction. It also contains a coil $p^3$, of perforated pipe the upper end of which is connected with a pipe $e$, which communicates with a cooling tank or chamber E, in which is situated a freezing coil $r$, connected with refrigerating apparatus indicated by R, Fig. 1. The cooling tank or chamber E, is provided with a temperature indicator $e'$, and a pressure gage $e^2$, and a check valve $e^3$, and regulator valve interposed in the connection pipe $e$. Another pipe $e^5$, provided with the control valve $e^6$, and check valve $e^{61}$, connects the cooling tank E, with the pipe $b^6$, between the purifier B, and the refining chamber C.

H, is a hydrolyzing tank for supplying, through pipe $h$, and valves $h'$, $h^2$, hydroxid solution to the refining chamber C. $e^6$, is a pipe leading from the pipe $e$, to the pipe $b^6$, and having interposed in it the check valves $e^8$, $e^{10}$, and control valves $e^7$, $e^9$, for controlling the flow, of cooled air from the tank E, to the injector I.

In carrying my invention into effect I proceed as follows: The oil bearing material i. e., crude oil fatty substances, for example aged deteriorated crude cotton seed oil containing gossypol, or off crude cotton seed oil, or unsaturated fats produced by cold process, or pressed fixed oils by expeller process of no deeper color reading than 35 yellow and 7.1 parts red in Levibond's tintometer; or moldy stained and disagreeable odor, and of a rancid taste and dark color produced by maize oil (corn oil): or polymerizing linseed oil by heating to 250° or to 300° cent., used in the arts; or saturated and unsaturated fat substitutes constituted of tristearin, triplalmitin, triolein, unfit for consumption tested by the violet color reaction test adopted by the U. S. Government for indication (Hans Kreis, Basel, 1904: Indicator and test for deteriorated rancid oil and fat, which consists of 1% phloroglucin solution in ether, and of hydrochloric acid (1.19) where equal volume of oil or melted fat and hydrochloric acid are well mixed and shaken and then has added to it a volume part of one per cent. ether phloroglucin solution and the admixture again well shaken and mixed, causing violet precipitate) is placed in the refiner C, Figs. 1 and 2. The mass is then thoroughly stirred or otherwise agitated and subjected to the action of a heating medium (indirect) at 600° cent., delivered thereto through the valves $s^{10}$ and $c^{11}$, of the branch $s^6$, of the superheated steam supply pipe $s$, and permitted to circulate through the coil of imperforate piping $c$, whereby the mass is heated about 90° cent., and then the valve closed. About 150 pounds power pressure is enough in the air compressor A′, to supply the unitary plant with compressed air. By pipe $a, a', a^2$, the compressed air is forced into the superheating chamber A, wherein it is heated to about 300° cent., by the superheated steam medium in $s^2$, Fig. 2, and then forced by same pressure through connected pipe $b, b', b^2$, into the purifier B. Into the portion of the dividing cylinder B, adjacent to the superheating chamber A, is introduced (CaO) calcium oxid and (Zn) zinc dust, and into the other portion of said cylinder formed as steam jacket $b^5$, is introduced (S) sulfur and (Cu) copper powder; also said steam jacket is supplied with a heating medium through pipe $s^6$, whereby the elementary agents (CaO, Zn, S, Cu) the sulfur may form a sulfur dioxid, the cuper may form cuprous oxid, the Zn may form ZnO, and during oxidation, the created gaseous vapors may combine together with the heated air passing through B to form a gaseous compound which acts upon the matter contained in tanks C, as prepared air, are heated to about 350° cent., and the action of contact with the passing compressed superheated atmosphere is then forced by the same source of pressure (A′) through pipe $b^6, b^8$, where between $b^7$, cold air from E, through $e^9$ through $b^7$, is forced to the injector I, by which it is induced into the perforated pipe $i^x$, in the refining tank C, thus injecting the heated air with contacted reacting elements and the cold air in the mass of material in the said tank C,—where it is subjected to such treatment during two hours. The pressure of said compressed superheated air forces it through the liquid matter in the tank C, and acting thereby as bleaching and purifying agent whereby the phenol, gossypol, ptomaine, clorophyl and other deteriorated moldy stained oil bearing fat substances are destroyed and eliminated.

While the fatty matter is maintained at about 90° cent. the control valves $s^{10}$, and $i'$, are opened to the action of direct superheated steam, together with the compressed prepared heated air contacted reacting substances which pass through $b^5, b^6$, and also through $e^5, e^{61}$ and $e^{62}$ into E, wherein the prepared heated air is cooled and then passes through $e, e^7, e^{10}, e^6, e^8, e^9$, to $b^8$, and $b^7$, when $e^7$, and $e^9$, are both opened, thereby communicating with the inlet to the perforated coil $i^x$, and is forced under high pressure into the oil bearing fatty substances through the mass and discharged at the service thereof through pipe $c^x$. This treatment during one hour destroys the enzyms, removes the volatile oxidized impurities and at the same time converts the unsaturated acid, whereby an increase of weight takes place and the iodin value falls.

Meanwhile the acting gases in the cylinder C, will be moved with sufficient rapidity by the high pressure derived from the air compressor A′, to prevent overheating, and discharged through $c^x$. Following this effect and according to the quantity of liquid fatty matter contained in the refiner C, the liquid fatty mass about 375 pounds is then charged with about 12 ounces sodium bisulfite (NaHSO$_3$) and about 4 ounces sodium hydrosulfite (Na$_2$S$_2$O$_4$). The pipe $i$ and valves $i', i^2$, by means of which steam is forced by the pressure of the boiler to the injector I, are opened to admit the steam to the perforated worm $i^x$, the steam being to mingle with the acting gases during three hours, whereby the fatty material is cooked. This cooking effect changes the non-volatile impurities, as lactones, etc., into a salt of oxy acid, and the sodium bisulfite precipitates the the non-volatile aldehydes, ketones, etc., in form of crystals schematic

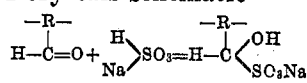

or separates to a cloudy heavy liquid.

Figure 3:
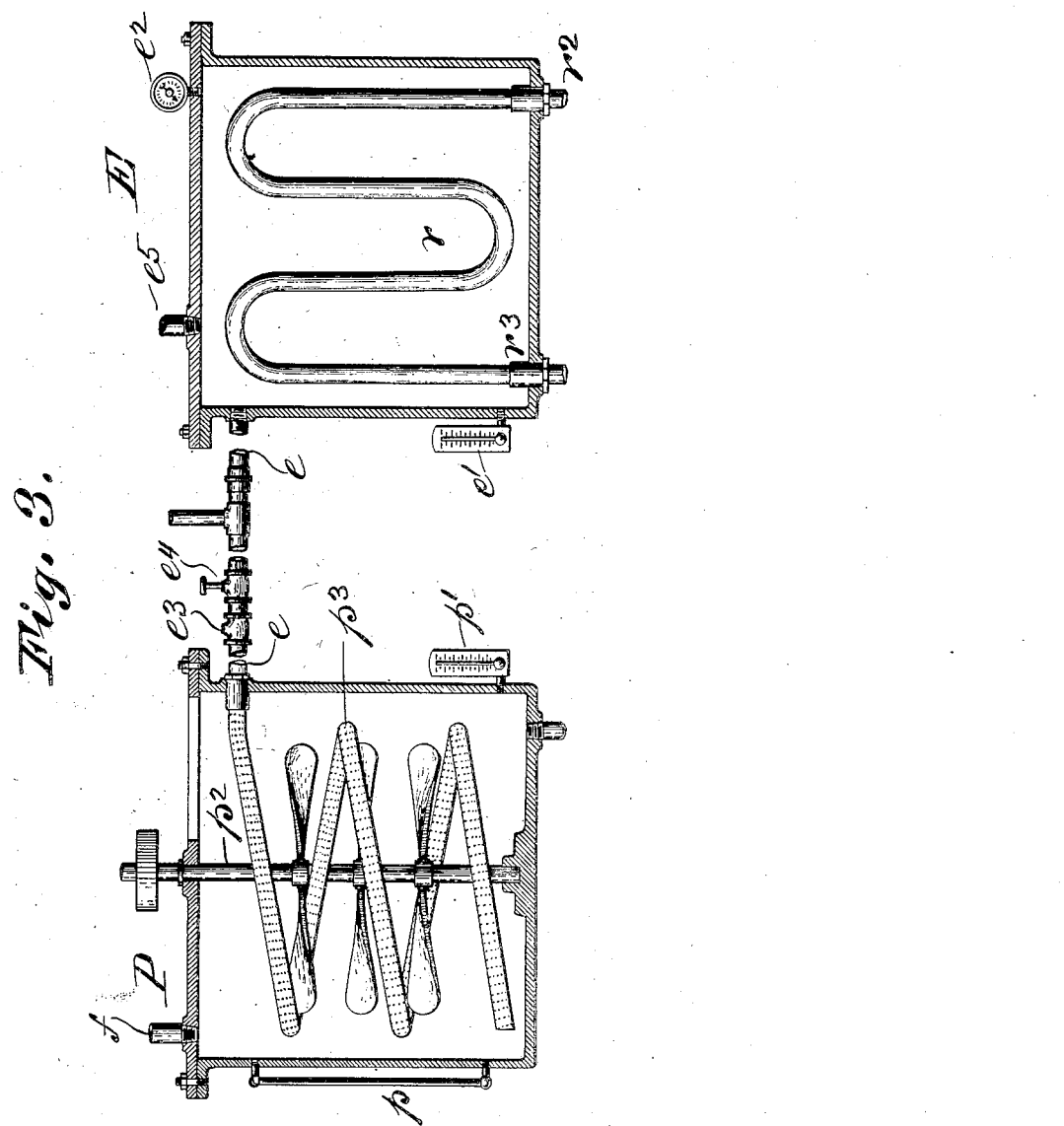
Fig. 3, is a similar view of the air freezer and finishing or product tank.

After the cooking process is finished, the said valves $i, c^{11}, b^8$, are closed and the mass reduced to 55° cent. by the prepared cooled air admitted into the refiner C, and is then neutralized. To neutralize the fatty mass the quantity and strongness of the alkali solution in tank H, Fig. 1, varies by the contact of the free fatty acid. For example, for a fatty material containing 5 to 7% of free fatty acid, 6% of a 25 Bé. hydroxid solution based on the weight of the fatty matter is used; in other words the acid value indicates the number of milligrams of hydroxid required to saturate the free fatty acid, and on this reaction is based the technical method of neutralizing the free fatty acid. Accordingly the mass of fatty matter in the refining tank C, now at 50° cent., is then intimately intermixed with the prepared proportion of hydroxid solution in tank H, Fig. 1, through the medium of pipe $h$, valve $h'$, pipe $i$, valves $i'$, $i^2$, and injector I, and is together with the prepared cooled air transmitted in small quantities in the form of a spray by perforated coil $i^x$, and sprinkler $i^3$, to isolate and combine the free fatty acid, which together with the impurities forming a scum or crystals to be precipitated, or fall down to the bottom and carry down the impurities. The best and finest edible oils should contain practically no free fatty acids. Even salad table oil and fatty substitutes are practically devoid of free fatty acid, as they should contain no more than 0.01 to 0.02% of free fatty acid, by the technical methods of neutralization. The fatty matter in the refining cylinder C, is then heated and mixed with contact and action of the compressed heated air with reacting substances to about 70° cent., and air shut off where after the mixture will readily separate on standing as this treatment serves to neutralize and precipitates the impure matters. The bleached, deodorized, purified refined and neutralized pure product is then decanted and filtered (F, representing the filtering means) and then introduced into the open finishing tank P, shown in detail in Fig. 3, for the purpose of congealing the higher fats from the fatty mass and separating it into a winter oil if required, or if desired to congeal it as an edible table fat substitute, in which case it is important to avoid the product becoming unctuous and semi-transparent, which would indicate that the mixture will separate in course of time by a kind of liquation process. This transaction is as follows:—The freezer E, in which cold brine or calcium chlorid solution or any other cooling medium furnished by a refrigerator R, is forced through check valve $r'$, whereby it enters at $r^2$, and runs along in the coil $r$, to leave at the opposite end $r^3$, thereby permitting the compressed prepared heated air to contact with reacting substances which enter through pipe $e^5$, and valve $e^6$, to be changed in the tank E, to be prepared in cooled air. This prepared cooled air is then forced by the pressure of the air from the compressor A', through the valve $e^3$, to enter into the perforated worm $p^3$, in the finishing tank P, where it circulates through the fatty mass, and in connection with the stirring apparatus $p^2$, will equalize and reduce the temperature of the mass, thereby congealing the product at the solidifying point 70 to 27 or —10.0 to 15° C. In order to impart to the finished product a pure white color the prepared cooled air is forced by the pressure into the mass and mingled until it acquires a salve like consistency, or the required consistency; but care must be taken that the produce is run out of the finishing tank at the proper temperature. The new edible food fatty product herein set forth derived from fixed oils and fats constituted of tristearin, tripalmitin, triolein, a regular even quality rid of free fatty acids and non-rancid by the removal of harmful aliphatic series of aldehyde, ketones, etc., having a required permanent reading of 21 yellow and 1–4 red to nearly water white color, by the removal of phenol, gossypol, chlorophyl, etc.; having a titer test of 13 to 41° C. when analyzed and tested. The product is tested in liquid form with phloroglucin indicator; it dissolves sparingly in warm absolute alcohol is readily soluble in warm ether and thus does not redden blue litmus paper. If the fixed oils and fats are exposed to atmospheric sunlight for about three days they become rancid, by absorbing atmospheric moisture, sunlight and oxygen, while the odor of rancidity is not noticeable until after a week of exposure, and the acidity will not change until after three weeks; while if they are protected from the atmosphere, moisture and light no such changes take place. Fresh fats are not rancid in odor and a fat may turn rancid without much increase in acidity. The presence of volatile aldehydic substances, ketones, alcohols, etc., is the cause of rancidity. Hydrolysis of the fat into glycerol and free acid is usually assumed to be the primary cause of rancidity, and also anhydrous fats have been shown to become rancid in an atmosphere of nitrogen, when merely exposed to sunlight. In general, however water and oxygen are favorable to the development of rancidity, and certain enzyms and microorganisms may aid. In most cases when the fat gets rancid the acidity does increase, and there is especially an increase in the amount of acids of low molecular weight, which have pronounced odors. The iodin value may decrease, showing a decrease in the proportion of unsaturated acids, which have either become saturated, or else broken down at the double bond into simpler compounds. Ketonic and aldehydic substances also appear. They give a distinct positive reaction of rancidity when ten grams of the oil or fat are heated at 35° C. until liquefied, mixed with four or five drops of diluted 3% hemoglobin water solution, ten drops of freshly prepared tincture (10 c. c. absolute ethyl alcohol) of guaiac (2 c. c.) and about ten cubic centimeters of saturated salt water solution and the mixture is shaken well for one minute. If the fixed oil or fat is rancid the emulsion which is formed by shaking is colored blue, the intensity of the color increasing with the increased degree of rancidity. In the case of only slightly rancid fats it is advisable to break up the emulsion by adding to the mixture an equal volume of alcohol in order to make the coloration more apparent. If the new product is pure and not rancid the emulsion which is formed by the distinct positive blue color reaction, is not colored blue after the mixture is shaken well and gives a definite reaction at the ending point. In order to prevent rancidity, fats and oils should be kept as free from moisture as possible, they should be shielded from the light, and the surface exposed to the air should be as small as possible; if the fats contain protein impurities bacteria may thrive, and accelerate the composition. As specified herein before it is manifest that I produce from the deteriorated moldy old damaged fixed oils and fats, a new product by subjecting the same to my new methods of compressed superheated air treatment in contact with reacting substances, and then subjecting the product to the action of superheated steam in contact with reacting elements, whereby all the objectionable, injurious to health, harmful, aliphatic compounds are separated and removed. The restored non-rancid fatty products are neutralized of free fatty acid and the product is then subjected to the action and contact of the cooled air whereby the product solidifies by the agency of cold, and the solidifying point is raised; or if required to form a pure white salve-like consistency.

My invention is not limited to the precise steps herein set forth for producing product from fixed oil and fat bearing material, and the production of compressed superheated air in contact with reacting substances and prepared cooled air below zero, but may be modified without departing from the scope of my invention.

What I claim as my invention and desire to secure by Letters Patent is:

1. The fatty product derived from fixed fatty oils and fats consisting of varieties of fat or oily matter non-rancid and rid of free fatty acids as indicated by the herein specified reaction with hemoglobin and guaiac, having a specific gravity 0.900 to 0.952 at 15° C., or 0.852 at 79° C., a neutralization 172 to 219, a permanent reading 21 yellow and 1-4 in Levibond's tintometer to nearly water color when analyzed and tested.

2. The fatty product derived from fixed fatty oils and fats consisting of varieties of edible unsaturated or saturated fatty matter, non-rancid and rid of free fatty acids as indicated by the herein specified reaction with hemoglobin and guaiac having a specific gravity of 0.900 to 0.952 at 15° C., or 0.852 to 0.952 at 79° C., a neutralization number 172 to 219, a permanent reading 21 yellow and 1-4 red in Levibond's tintometer to nearly water color when analyzed and tested.

3. The fatty edible product comprising varieties of solid fat and liquid oils, definitely rid of free fatty acids, as indicated by the herein specified reaction with hemoglobin and guaiac having a specific gravity 0.900 to 0.952 at 15° C. or 0.852 to 0.952 at 79° C., a neutralization number 172 to 219, a permanent reading 21 yellow and 1-4 red in Levibond's tintometer to nearly water color when analyzed and tested.

4. The fatty product comprising edible oil or fatty matter, non-fetid, rid of free fatty acids as indicated by the herein specified emulsion which is formed by the distinct positive blue color reaction with hemoglobin and guaiac whereby the product is not colored blue after shaking, having a specific gravity 0.900 to 0.952 at 15° C., or 0.852 to 0.952 at 79° C., a permanent reading 21 yellow and 1-4 red in Levibond's tintometer, to nearly water color, when analyzed and tested.

5. The fatty product comprising tristearin, tripalmitin, triolein, non-rancid, and rid of free fatty acids as indicated by the herein specified reaction with hemoglobin and guaiac having a specific gravity 0.900 to 0.952 at 15° C., or 0.852 to 0.952 at 79° C., a permanent reading 21 yellow and 1-4 red (in Levibond's tintometer) to nearly water color, when analyzed and tested.

6. The fatty edible oil product comprising glyceryl esters, non-rancid, rid of deteriorated harmful aliphatic phenol, gossypol, chlorophyl, and rid of free fatty acids, as indicated by the herein specified reaction with hemoglobin and guaiac, having a specific gravity 0.900 to 0.952 at 15° C., or 0.852 to 0.952 at 79° C., a permanent reading 21 yellow and 1-4 red (in Levibond's tintometer) to nearly water color as analyzed and tested.

7. The edible fatty compound product comprising glyceryl esters, non-rancid, rid of free fatty acids, rid of aldehydes, ketones, lactones, and developed harmful aliphatic compounds as indicated by the herein specified reaction with hemoglobin and guaiac having a specific gravity 0.900 to 0.952 at 15° C., or 0.852 to 0.952 at 79° C., a permanent reading 21 yellow and 1-4 red (in Levibond's tintometer) to nearly water color as analyzed and tested.

8. The fatty product comprising solid fatty matter non-rancid, free of harmful aliphatic compound and rid of free fatty acids as indicated by the herein specified reaction with hemoglobin and guaiac, having a specific gravity 0.900 to 0.952 at 15° C., or 0.852 to 0.952 at 79° C., a permanent reading 21 yellow and 1-4 red (in Levibond's tintometer) to nearly water color when analyzed and tested, 9. The fatty product comprising edible oil or oils, non-rancid and rid of free fatty acids as indicated by the herein specified reaction with hemoglobin and guaiac, having a specific gravity 0.900 to 0.952 at 15° C., or 0.852 to 0.952 at 79° C., a permanent reading 21 yellow and 1–4 red in Levibond's tintometer to nearly water color as analyzed and tested.

10. The fatty product comprising edible compound non-rancid and rid of free fatty acids as indicated by the herein specified reaction with hemoglobin and guaiac having a specific gravity 0.900 to 0.952 at 15° C., or 0.852 to 0.952 at 79° C., a permanent reading 21 yellow and 1–4 red (in Levibond's tintometer) to nearly water color as analyzed and tested.

11. The edible fatty product derived from fixed fatty oils and solid fats, non-rancid and rid of free fatty acids as indicated by the herein specified reaction with hemoglobin and guaiac, having a specific gravity 0.900 to 0.952 at 15° C., or 0.852 to 0.952 at 79° C., a permanent reading 21 yellow and 1–4 red (in Levibond's tintometer) to nearly water color when analyzed and tested.

12. In the manufacture of fatty product, derived from fixed oil and fat, which has been bleached, the deteriorated matter, etc., destroyed, and the enzyms and volatile oxidized impurities removed and decolorized, the process of charging the liquid fatty mass with sodium bisulfite and sodium hydrosulfite and at the same time injecting steam and cold air previously sterilized which change the non-volatile impurities into a salt of oxy-acid, and whereby the sodium bisulfite precipitates the non-volatile aldehydes, ketones, etc., in the form of crystals, as and for the purpose described.

13. In the manufacture of edible fatty product from fixed oil and fats of the character specified, the process of treating bleached, deodorized, purified, refined, neutralized pure product by introducing it into a finishing tank in presence of cold air previously sterilized by heat for the purpose of congealing the higher fats from the fatty mass and separating same into a winter oil, or congealing same either into an edible table fat substitute at a solidifying point 10 below zero to 15° C., of pure white color, or until the mass acquires a salve like consistency, as and for the purpose described.

EMANUEL KLEIN.

Witnesses:
    Geo. Wm. Miatt,
    Dorothy Miatt.